J. P. KERRIGAN.
TUBE EXPANDER.
APPLICATION FILED MAY 14, 1913.
1,077,837.
Patented Nov. 4, 1913.
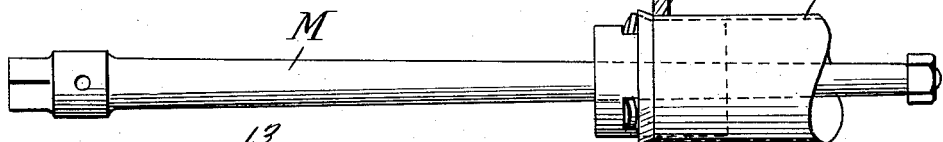
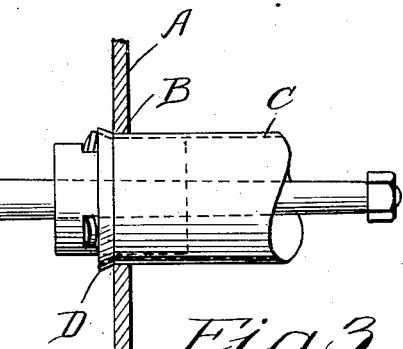
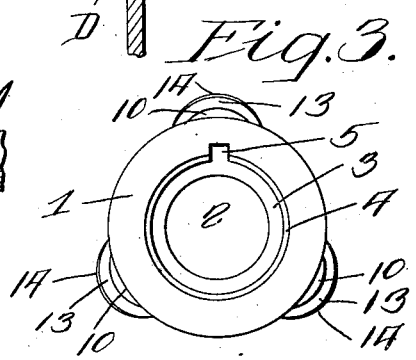
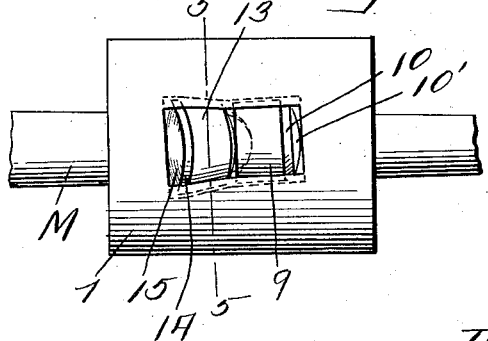
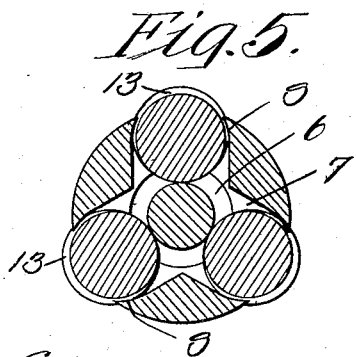
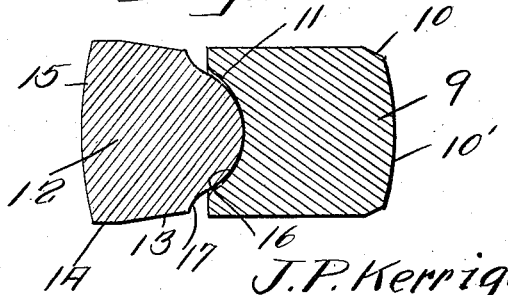
Witnesses
Inventor
J. P. Kerrigan
By
Attorneys

UNITED STATES PATENT OFFICE.

JAMES P. KERRIGAN, OF WILMINGTON, DELAWARE.

TUBE-EXPANDER.

1,077,837.

Specification of Letters Patent.

Patented Nov. 4, 1913.

Application filed May 14, 1913. Serial No. 767,602.

*To all whom it may concern:*

Be it known that I, JAMES P. KERRIGAN, a citizen of the United States, residing at Wilmington, in the county of Newcastle, State of Delaware, have invented certain new and useful Improvements in Tube-Expanders; and I do hereby declare the following to be a full, clear, and exact description of the invention, such as will enable others skilled in the art to which it appertains to make and use the same.

This invention relates to certain novel and useful improvements in tube expanders, and has particular application to a tool adapted to be employed in fixing the end of a tube in a tube sheet or plate.

In carrying out my invention it is my purpose to provide a tool adapted to be inserted in the ends of a tube which is seated in the tube aperture or bore of a tube sheet, the tool being so operated that the end of the tube will be expanded against the tube seat, and at the same time its outer end will be flared or forced outwardly to hold the tube in position.

It is also my purpose to provide a tool which may be employed in expanding and flaring tubes for boilers of various types, and the device is also particularly useful in flanging steam and water pipes into connecting fittings therefor.

I also provide a self-feeding device which is substantially self-adjusting to various conditions of work without the necessity of employing additional guides, collars and the like under ordinary circumstances.

Still a further object of my invention is the provision of an expanding and flanging tool which will embody the desired features of simplicity, durability, efficiency and reliability, and which may be manufactured and marketed at a relatively low cost.

With the above recited objects and others of a similar nature in view, my invention consists in the construction, combination and arrangement of parts set forth in and falling within the scope of the appended claims.

In the accompanying drawings: Figure 1 is a view in side elevation of a tool embodying my invention and showing the same in working position on a tube. Fig. 2 is a view partly in vertical longitudinal section and partly in elevation. Fig. 3 is an end view. Fig. 4 is a top plan view. Fig. 5 is a cross sectional view taken on the line 5—5 of Fig. 4. Fig. 6 is a horizontal sectional view taken through the ball socket rollers on the line 6—6 of Fig. 2.

Referring now to the accompanying drawings in detail, the letter A indicates a tube sheet having the usual aperture B therein, the wall of which forms a seat for the tube C, the outer end D of which projects beyond the outer face of the tube sheet, this end D being adapted to be flanged or flared by means of my improved tool so that the tube may be fixed in the sheet.

My tool comprises a body or cage 1, which is cylindrical in form and made of any suitable metal, this body having a longitudinal bore 2 extending therethrough, and at one end, in the present instance the inner end, the cage is formed with a circular recess 3 threaded as at 4 for the reception of the correspondingly threaded end of a sleeve or the like which it might be desired to employ under special conditions of work, a keyway 5 being formed in the wall of the recess for the reception of a fastening key for locking the sleeve.

Extending through the longitudinal bore of the cage body is the usual tapered mandrel M which is employed for operating the tool. This mandrel is of less cross diameter than the bore 2 of the cage so that a space 6 is formed between the mandrel and the wall of the bore. Communicating with the bore are the radially extending rectangular slots 7 formed in the body of the cage, these slots in the present instance being three in number, arranged in triangular relation.

The outer longitudinal edges of the side walls of each slot are extended inwardly to form retaining flanges 8 for the expanding and flanging devices of the tool. Each of these devices comprises a socket roller member 9 and ball roller member 12. The major portion of the body of the socket member 9 is cylindrical in form and at one end is beveled inwardly as at 10 with the end face rounded as at 10′. The opposite end of the socket member is grooved as at 11 to form a socket. The ball member 12 of the device has a circumferential outwardly tapered central portion 13, the widened end of which merges into the flange 14 which is of uniform cross dimensions and has its outer end face 15 rounded or curved, this curved face forming the end of the ball roller. The opposite end of the ball member 12 terminates in a semispherical or ball section 16, the base of which merges into the beveled flange 17 formed at the narrow end of the central tapered portion 13. Each of the rectangular slots in the cage body is adapted to receive one of these expanding and flanging devices, and from the above description taken in connection with the accompanying drawings, the construction and operation of my device will be readily apparent to those skilled in the art.

Referring to Fig. 2, it will be seen that when the tool is assembled with the mandrel in place, it is designed to be inserted in the end of the tube so that the socket roller sections will bear at their cylindrical portions against the inner wall of the tube at the tube seat, and against the tapered mandrel. Likewise the ball roller members will bear at their tapered central portions against the outwardly extended end of the tube, and against the mandrel, the ball and socket rollers being held in the cage by the mandrel and by the longitudinal flanged edges 8 of the cage body. As the mandrel is turned and fed inwardly in the usual manner, the socket members will expand the tube at the tube seat while the ball members will flange or flare the extended end of the tube as clearly shown in Fig. 2.

It will be noted that I have provided an exceedingly convenient, simple and efficient tool by means of which tubes may be quickly and securely fixed in tube sheets, headers and the like.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims, for instance, any suitable pair of rollers may be employed, and the size and shape of the cage body may be varied without departing from the invention.

What I claim is:

1. In a tool for expanding a tube, the combination with a body portion adapted to be inserted within the tube, of a socket roller, a ball roller abutting against and working in the socket of the socket roller, and means for forcing the rollers against the inner wall of the tube to expand such tube.

2. The combination with a body portion, of a substantially cylindrical tube expanding roller having a socket in one end thereof, a tube flanging roller provided with a beveled shoulder terminating in a ball-like section adapted to work within the socket of the expanding roller, and a tapered mandrel adapted to operate the rollers.

3. The combination with a body portion, of a roller having a cylindrical section adapted to extend within a tube, said roller having a socket in one end thereof, and a second roller having a tapered portion adapted to bear against the tube, said second roller having a ball section adapted to seat within the socket of the first mentioned roller, and means for operating the rollers.

4. In a tool for expanding a tube, the combination with a cage adapted to be inserted within the tube, said cage having a bore and slot communicating with the bore, of a socket roller member extending through the slot, a ball roller member also extending through the slot and arranged abutting end to end with the socket roller member, and means for forcing the roller members against the inner wall of the tube to expand such tube.

5. In a tool for expanding a tube, the combination with a cage having a bore and a series of slots communicating with the bore, the walls of said slots forming retaining means, of a socket roller member arranged within each slot, a ball roller member arranged within each slot and abutting end to end with the socket member in the slot, and a mandrel extending through the bore of the cage for forcing the roller members against the inner wall of the tube to expand such tube.

In testimony whereof, I affix my signature, in the presence of two witnesses.

JAMES P. KERRIGAN.

Witnesses:
CHARLES J. MARDEN,
WILLIAM B. HARRINGTON.